Patented June 4, 1935

2,003,347

UNITED STATES PATENT OFFICE 2,003,347

MANUFACTURE OF CELLULOSE OR CELLULOSIC MATERIALS

Henry Dreyfus, London, England

No Drawing. Application January 25, 1933, Serial No. 653,474. In Great Britain February 16, 1932

2 Claims. (Cl. 92—9)

This invention relates to the manufacture of cellulose or cellulosic materials from wood, straw, grasses, and other lignified cellulosic materials.

In the preparation of cellulose from wood or other lignified cellulosic materials it is usual to subject the wood or other materials to cooking or digestion with chemical liquors, at high temperatures and under pressure, to remove the non-cellulosic constituents. As instances of such processes may be mentioned the sulphite process, sulphate process and the soda process. Whilst such processes have met with great success in the manufacture of paper and paper pulps and of raw cellulose for the manufacture of viscose, they suffer from several defects or drawbacks. Thus, for instance, particularly in cases where the cooking or digestion has been carried out under high temperatures and for prolonged periods of time, a considerable degradation of the cellulose may occur so that the products are unsuitable for many purposes, e. g. the production of high grade cellulose esters.

I have now found that cellulose or cellulosic materials can be produced in a highly satisfactory manner by subjecting wood, straw, grasses or other lignified cellulosic materials to treatment with alcohols of high or relatively high boiling point, and particularly with aqueous solutions of such alcohols. Alcohols of boiling point above about 120° C. and especially above about 170° C. are very useful for the purposes of the invention. Advantageously dihydroxy compounds such as ethylene glycol, diethylene glycol, propylene glycol, trimethylene glycol or alcohols containing three or more hydroxyl groups such as glycerol may be employed.

In utilizing the invention I may heat or cook the wood or other materials with the alcohols, and particularly with the aqueous solutions thereof, in any convenient way. Temperatures of upwards of about 100° C. are generally sufficient to ensure good and rapid extraction or separation of the lignins or other encrusting substances, though higher temperatures e. g. about 120 to 180° C. or more are often advantageous. The heating or cooking may be performed under ordinary atmospheric pressure, or if desired under pressures higher or considerably higher than atmospheric. Elevated pressures, where such are employed, may be produced in any convenient way, e. g. simply by performing the treatment in closed digesters or, especially when pressures considerably higher than atmospheric are to be employed, by pumping in air, carbon dioxide, nitrogen or other gases or even vapours into the digesters and/or by incorporating in or mixing with the materials suitable low boiling liquids for example methyl alcohol, ethyl alcohol, benzol, and petroleum ether. Preferably the materials are impregnated as homogeneously as possible with the alcohols or solutions thereof prior to their being subjected to cooking or digestion. If desired, the impregnation may be effected under pressure, or the materials may first be subjected to reduced pressure and thereafter impregnated under pressure.

The invention is not limited as to the proportion of the alcohols or solutions thereof to be employed for the purposes of the invention. Quantities between about 8 and 20 times the weight of the materials to be treated are usually very suitable.

The time of cooking or digestion may vary considerably with the materials to be treated, the temperature and other conditions employed and the degree to which it is desired to remove the encrusting substances. Generally, however, a period of from about 3 to 12 hours is sufficient even in case where it is desired to remove substantially all encrusting substances.

If desired the cooking or digestion may be performed as a number of consecutive cookings or digestions.

After cooking or digestion the cellulose can be separated and recovered from the encrusting substances dissolved or separated by the alcohols or solutions thereof in any convenient way. For instance, the insoluble cellulosic residue may be freed as far as possible from the liquors, e. g. by decantation, filtration, pressing or the like, and thereafter treated to remove any encrusting substances remaining in the materials. For instance, the materials may be extracted with fresh alcohols or aqueous solutions thereof or with other liquids, preferably such as are not liable to precipitate encrusting substances from the solution held in the materials.

As above indicated aqueous solutions of the alcohols are particularly suitable for the purposes of the invention. Such solutions readily enable the lignins and other encrusting substances to be separated from the materials to a very high degree or substantially completely with but little or no deleterious action upon the cellulose. Solutions containing between about 30 and 80% of water, and particularly between 40 and 60% of water, are very suitable for the purposes of the invention. It is to be understood, however, that the invention is not limited to such concentrations.

The process of the invention may be applied to the treatment of any woods, straws, grasses or other lignified cellulose materials in any form. Advantageously, however, the materials may be employed in small or fine form, e. g. wood in the form of chips, sawdust or the like.

The invention is not limited to the simple cooking or digestion of the materials with the alcohols or aqueous solutions, but embraces all processes wherein such alcohols or solutions are employed to effect or aid extraction or separation of the encrusting substances from the cellulose in the materials to be treated. For instance, the materials may prior to subjection to the cooking or digestion be treated in any convenient way to remove resins or the like e. g. by extraction with dilute alkali. Moreover, if desired the alcohols or aqueous solutions may be employed in conjunction with chemical reagents capable of removing lignins or other encrusting substances, for instance the materials may be subjected prior to the cooking or digestion to the action of liquors such as are employed in the sulphite, sulphate or soda processes, particularly if such liquors are applied at a moderate temperature (e. g. not substantially exceeding about 120° C.) or in any other manner not liable to effect any substantial attack on the cellulose. Further, if desired, such chemical reagents may even be incorporated in the cooking or digesting liquors of the invention. If desired or requisite, the cellulose produced by the process of the inventor may be subjected to the action of such chemical reagents for further purification.

By the process of the invention celluloses of highly satisfactory quality may be obtained without substantial degradation. The cellulose or cellulosic materials obtainable are applicable for the manufacture of cellulose acetate or other cellulose esters or cellulose ethers of high grade or quality, while derivatives may be converted into very satisfactory artificial threads, films and other products. Moreover, very useful cellulose artificial threads, films or the like can be produced from the cellulose or cellulosic materials by the viscose, cuprammonium or like processes.

The following example is intended to illustrate the invention, which is in no way limited thereby.

*Example*

A fine mechanical spruce pulp is fed into a closed digester, and subjected to a reduced pressure of about 10 inches or less of mercury; at this low pressure an aqueous solution containing 55 parts of ethylene glycol to 45 parts of water is run into the digester, in amount about 10 times the weight of the pulp to be treated. The temperature is then raised to about 160° C. for a period of about 6 hours, after which the materials are allowed to cool and the liquor is run off from the solid cellulosic material. The latter is then washed with a solution similar to that employed for the cooking process, and the liquor removed therefrom substantially completely by filtering and pressing, leaving a cellulose which may be used for the manufacture of cellulosic derivatives such as cellulose acetate.

In the following claims the term "lignified cellulose materials" includes wood, straw, grass and like materials.

What I claim and desire to secure by Letters Patent is:—

1. Process for the separation of non-cellulosic constituents from lignified cellulose materials which comprises digesting the materials with an aqueous solution of a di-olefine glycol at a temperature between 120° and 180° C.

2. Process for the separation of non-cellulosic constituents from lignified cellulose materials which comprises digesting the materials with an aqueous solution of diethylene glycol at a temperature between 120° and 180° C.

HENRY DREYFUS.